United States Patent
Fan

(10) Patent No.: US 7,454,253 B2
(45) Date of Patent: Nov. 18, 2008

(54) FAST PERFORMANCE PREDICTION OF MULTIVARIABLE MODEL PREDICTIVE CONTROLLER FOR PAPER MACHINE CROSS-DIRECTIONAL PROCESSES

(75) Inventor: Junqiang Fan, Vancouver (CA)

(73) Assignee: Honeywell ASCA Inc., Mississauga, Ontario (CA)

( * ) Notice: Subject to any disclaimer, the term of this patent is extended or adjusted under 35 U.S.C. 154(b) by 189 days.

(21) Appl. No.: 11/393,474

(22) Filed: Mar. 30, 2006

(65) Prior Publication Data
US 2007/0239310 A1 Oct. 11, 2007

(51) Int. Cl.
G06F 19/00 (2006.01)
(52) U.S. Cl. .............................. 700/29; 702/150; 702/12
(58) Field of Classification Search .................... 700/29, 700/31, 37, 19, 42–44, 52, 266; 702/150; 703/12; 162/192
See application file for complete search history.

(56) References Cited

U.S. PATENT DOCUMENTS

| | | | |
|---|---|---|---|
| 5,121,332 A * | 6/1992 | Balakrishnan et al. ...... | 700/127 |
| 5,347,446 A | 9/1994 | Iino et al. | |
| 5,574,638 A | 11/1996 | Lu | |
| 5,893,055 A | 4/1999 | Chen | |
| 6,064,809 A * | 5/2000 | Braatz et al. ................... | 703/2 |
| 6,086,237 A | 7/2000 | Gorinevsky et al. | |
| 6,253,113 B1 | 6/2001 | Lu | |
| 6,751,510 B1 | 6/2004 | Tan et al. | |
| 6,807,510 B1 * | 10/2004 | Backstrom et al. .......... | 702/150 |
| 6,819,964 B2 | 11/2004 | Harmse | |
| 6,826,521 B1 | 11/2004 | Hess et al. | |

OTHER PUBLICATIONS

Fan et a., Two-Dimensional Freqence Response Analysis and Insight for Weight Selection in Cross Directional model Predictive Control. FANrtal, Ph.D. dissetation, Univ. British Columbia, Vancouver, CA 2003.*
Fan et al., Approximate Steady-State Performance Prediction of Large-Scale Constrained MPC Systems, IEEE Transactions on Control Systems Tech, vol. 13, No. 6 Nov. 2005, 884-895.
Rao & Rawlings, Steady States and Constraints in MPC, Aiche Journal, vol. 4, No. 6, 1999 pp. 1266-1278.
Willis & Heath, Analysis of Steady-State Performance for Cross-Directional Control, IEE proceedings:Control Theory Application, vol. 149, No. 5 2002, pp. 433-440.
Hague T A et al., Application and roll-out of infinite horizon MPC employing a nonlinear . . . , Journal of Process Control, Oxford, GB, vol. 15, No. 2, Mar. 2005, p. 201-213.

* cited by examiner

Primary Examiner—Kidest Bahta
(74) Attorney, Agent, or Firm—Cascio, Schmoyer & Zervas

(57) ABSTRACT

A technique for fast performance prediction of multivariable model predictive controllers (MPC) for large-scale spatially-distributed dynamic systems is provided. When operating an MPC for a two-dimensional sheetmaking process, the controller's performance can be separated into spatial performance and dynamic performance. The steady-state spatial performance for different sheet property modes is first predicted, thereafter, the dynamic performance is predicted on the basis of the steady-state actuator profiles. During the steady-state spatial performance prediction, the original MPC's cost function is approximated to be a steady-state cost function. Then the steady-state measurement profiles and the actuator profiles are calculated through the steady-state cost function. The actuator profiles in time series can be efficiently solved by minimizing the difference between the actuator profiles and the steady-state actuator profiles in the face of constraints. Finally, the model can be employed to expeditiously compute the measurement profiles in times series.

25 Claims, 7 Drawing Sheets

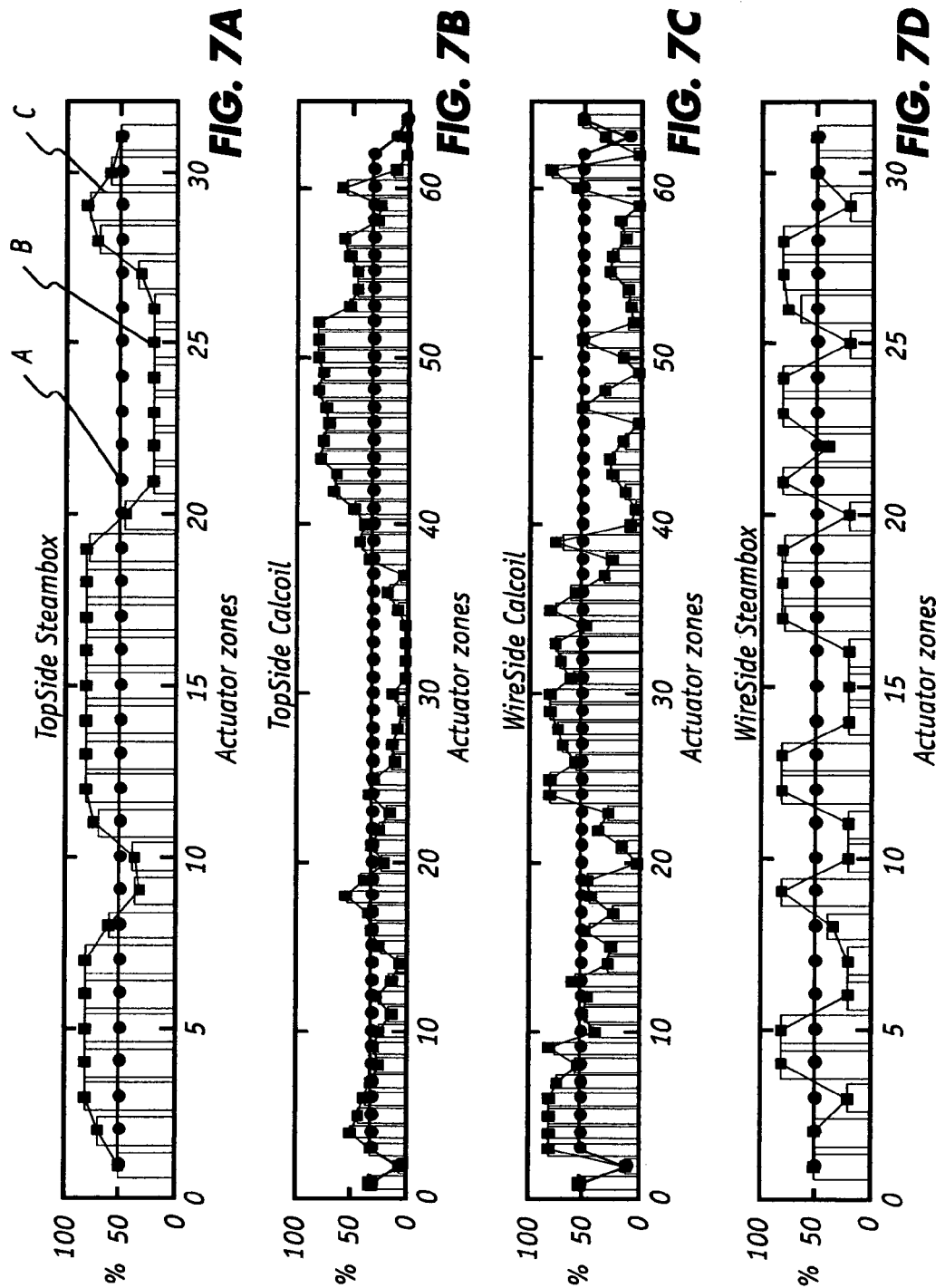

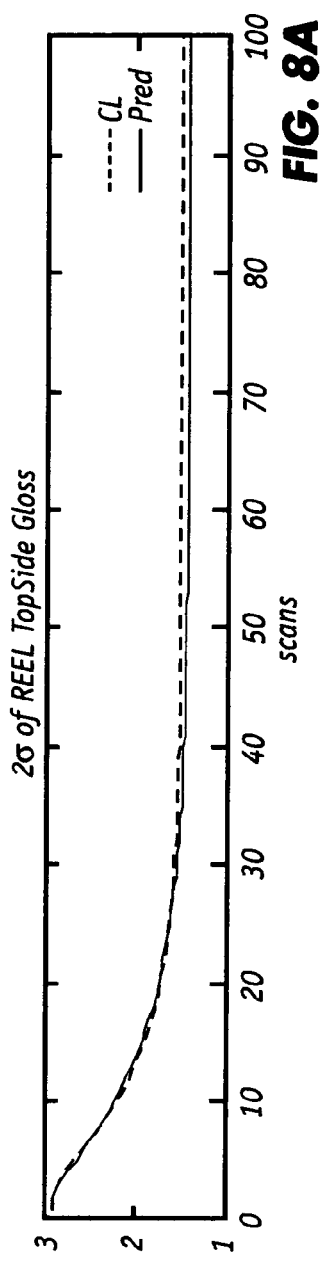
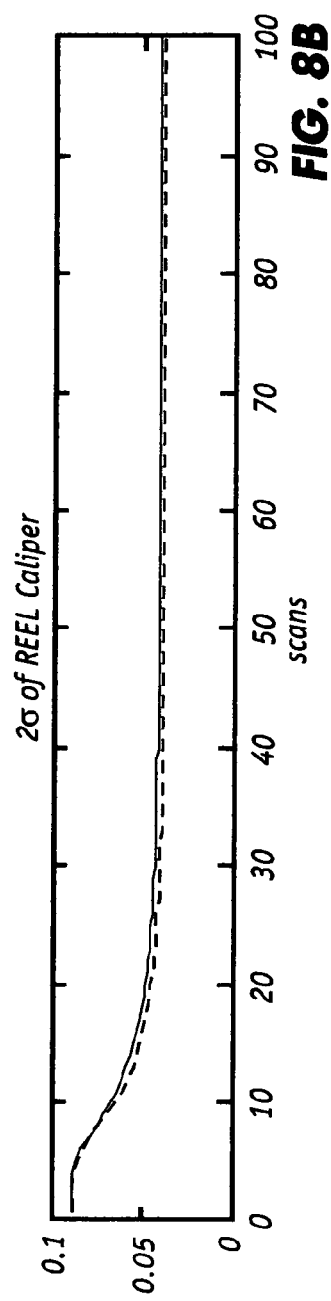
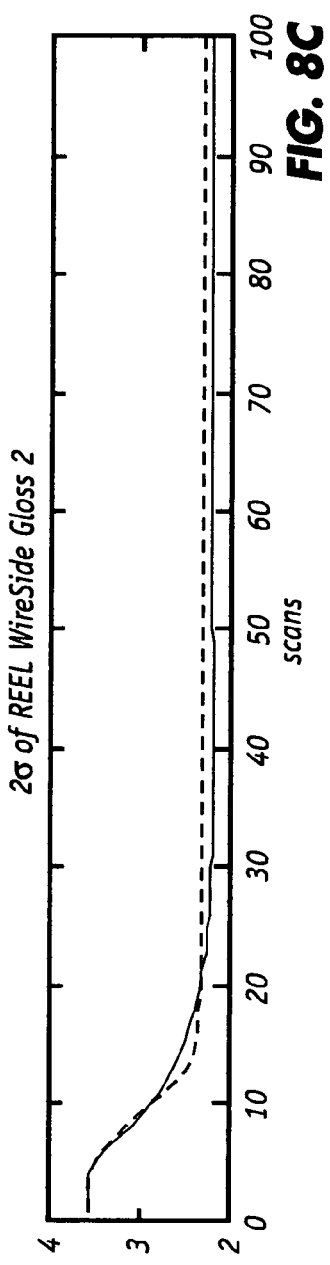

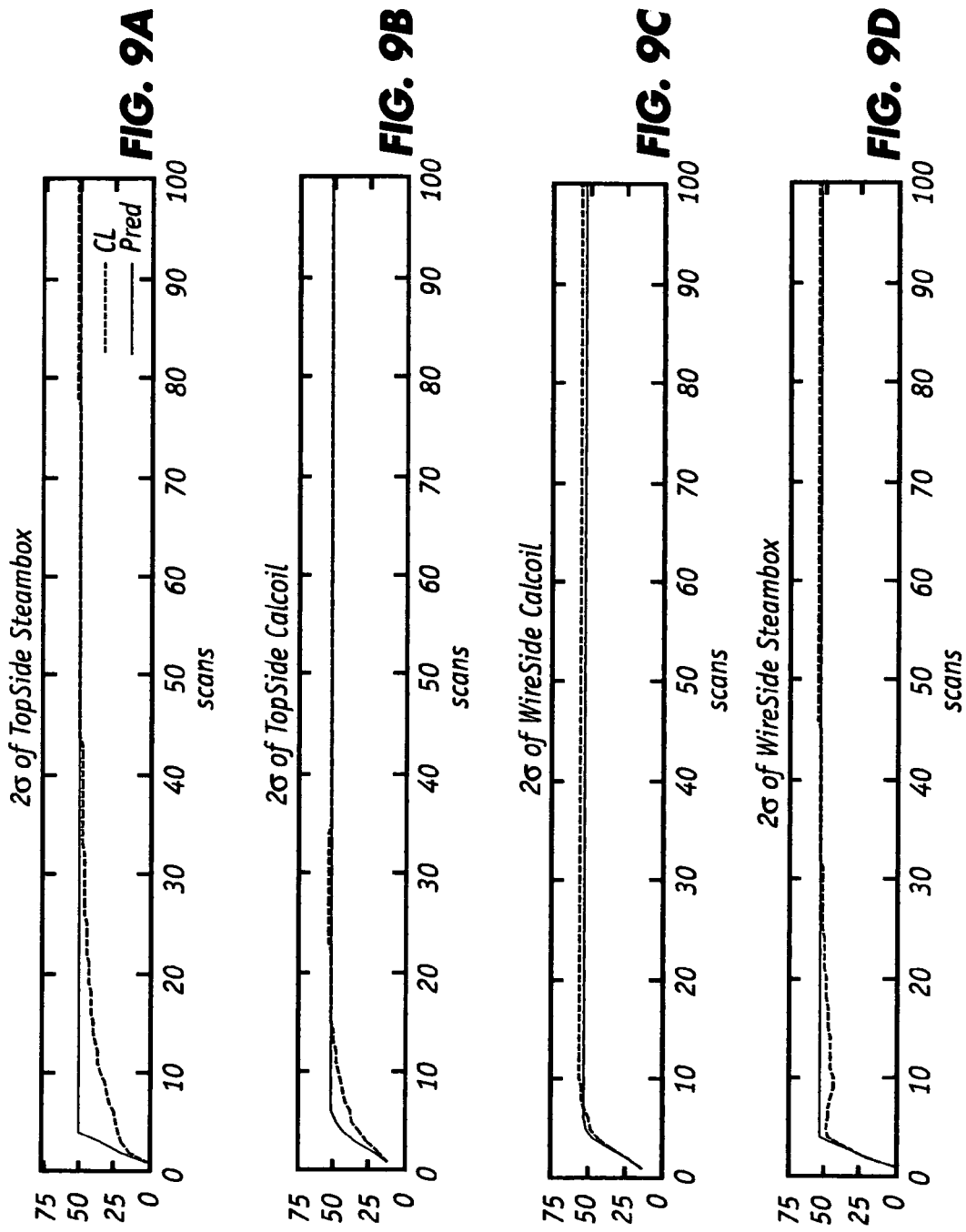

US 7,454,253 B2

FAST PERFORMANCE PREDICTION OF MULTIVARIABLE MODEL PREDICTIVE CONTROLLER FOR PAPER MACHINE CROSS-DIRECTIONAL PROCESSES

FIELD OF THE INVENTION

The present invention generally relates to techniques for monitoring and controlling continuous sheetmaking systems with a multivariable model predictive controller (MPC) and more specifically to expeditious techniques for correctly predicting the controller's performance with optimal tuning parameters in the face of active constraints.

BACKGROUND OF THE INVENTION

In the art of making paper with modern high-speed machines, sheet properties must be continually monitored and controlled to assure sheet quality and to minimize the amount of finished product that is rejected when there is an upset in the manufacturing process. The sheet variables that are most often measured include basis weight, moisture content, and caliper, i.e., thickness, of the sheets at various stages in the manufacturing process. These process variables are typically controlled by, for example, adjusting the feedstock supply rate at the beginning of the process, regulating the amount of steam applied to the paper near the middle of the process, or varying the nip pressure between calendaring rollers at the end of the process.

A paper machine employs large arrays of actuators spread across a continuously moving web to control the cross-directional (CD) profiles of paper properties as measured by one (or several) scanning sensor(s) downstream from the actuators. The CD actuators generally consist of an array of independently controlled actuators mounted in a beam that spans the width of the moving sheet in the CD. Traditionally, CD actuators have been designed with the intent of controlling a single measured profile. Slice lip and dilution profiling actuators are located in the headbox and are designed to control the weight profile of the paper. Steam box and rewet shower actuators are located further down the machine and are designed to control the moisture content of the sheet. Finally, induction heating actuators are located at the dry end of the paper machine and locally heat the rolls in the calendar stack and through thermal expansion or contraction of the roll to increase or decrease the pressure imposed on and, hence the caliper of the paper sheet.

In practice these actuators often have a significant effect on more than one measured profile. For example, slice lip actuators are force actuators which are designed to modify the height of the gap exiting the headbox and, thus, control the distribution of stock extruded on the wire screen in an effort to control the weight profile. Data from newsprint machines have shown that operation of the slice lip also significantly impacts the moisture profile (as opening slice means more water on wire and slower dewatering for heavier sheets). Additional multivariable effects arise from the use of "redundant" actuator arrays.

CD control refers to the control system designed to reduce the variability in the paper sheet properties as a function of the cross-direction. Typically, designers are using pairing rules to choose one CD actuator array for controlling one paper sheet property and the interaction of multiple array CD processes is usually neglected in traditional CD control.

Most well-designed single array CD systems are unfortunately ill-conditioned. Even at steady-state, some of their singular values are vanishingly small. The large dimensionality and the ill-conditioning make these processes challenging to control. It has been recently found that for multiple array CD processes the ill-conditioning of the process could be due to the interaction between multiple array measurements and actuators. That means it can be much more difficult to control multiple array CD systems than single array CD systems.

Application of model predictive control (MPC) in CD processes has been considered for some time. Although most published papers consider only one actuator array and one controlled property and consequently do not address the problem of coordinating multiple CD actuator arrays controlling multiple sheet properties, multiple array CD control systems are becoming more prevalent. Industrial model predictive control implementation can employ a multiple-array model of the CD process that is obtained from a complementary industrial model identification tool such as the method described in U.S. Pat. No. 6,086,237 to Gorinevsky and Heaven which is assigned to Honeywell International, Inc. The advantages of multiple-array control are evident in the improved performances that have been reported. The main disadvantage is the enormous computational load required for online optimization as the constrained quadratic programming (QP) problem may be required to generate as many as 600 actuator setpoints subject to up to 1800 constraints from up to 6000 measurements as often as every 15 seconds.

A procedure for implementing a paper machine CD MPC control system is shown as a sequence of six steps in FIG. 1. The tuning step where the prediction horizon and control horizon, and optimization weights are selected is often ad hoc and typically evaluated via simulations of the closed-loop system. A consistent automated tuning method for large-scale CD MPC is described in U.S. patent application Ser. No. 11/260,809 entitled "Automated Tuning of Large-Scale Multivariable Model Predictive Controllers for Spatially-Distributed Process," by Fan & Stewart and filed on Oct. 27, 2005.

Even after the multivariable CD predictive controller is properly tuned, the task of correctly predicting the controller's performance, which corresponds to step 4 in FIG. 1, in an efficient way with the optimal tuning parameters in the face of active constraints, remains. This has not been accomplished satisfactorily especially for dynamic performance prediction because of the large scale dimensional problem. The state of the art of performance prediction for large-scale MPC with active constraints is to run the MPC in a closed-loop simulation that may take at least 10 to 15 minutes to complete.

SUMMARY OF THE INVENTION

The present invention is based in part on the recognition that when operating an MPC for a two-dimensional sheetmaking process, the controller's performance can be separated into spatial performance and dynamic performance. With the invention, the steady-state spatial performance for different sheet property modes is first predicted, thereafter, the dynamic performance is predicted on the basis of the steady-state actuator profiles. During the steady-state spatial performance prediction, the original MPC's cost function is approximated to be a steady-state cost function. Then the steady-state measurement and actuator profiles can be calculated through the steady-state cost function. After obtaining the steady-state actuator profiles, the actuator profiles in time series can be efficiently solved by minimizing the difference between the actuator profiles and the steady-state actuator profiles in the face of constraints. Finally, after obtaining the actuator profiles in time series, the model can be employed to expeditiously compute the measurement profiles in times series. For a typical CDMD MPC system, the entire performance prediction process requires less than one minute to complete. The invention is applicable to different sheet property modes: CD only, MD only, or CD & MD.

In one embodiment, the invention is directed to a method of fast approximating the performance of a cross-direction machine-direction multivariable model predictive controller (CDMD MPC) for a spatially-distributed sheet process that includes the steps of:

(a) identifying a process model for the spatially-distributed sheet process;

(b) inputting tuning parameters and constraints into the CDMD MPC;

(c) calculating the steady-state spatial performance for the CDMD MPC; and (d) calculating the dynamic performance for the CDMD MPC.

In another embodiment, the invention is directed to a process control system having a cross-direction machine-direction multivariable model predictive controller (CDMD MPC) for providing control to a spatially-distributed sheet process having at least one manipulated actuator array and at least one controlled measurement array, a method for providing control of a process that includes the steps of:

(a) identifying a process model for the spatially-distributed sheet process;

(b) inputting tuning parameters and constraints into the CDMD MPC;

(c) calculating the steady-state spatial performance for the CDMD MPC;

(d) calculating the dynamic performance for the CDMD MPC;

(e) comparing the calculated spatial and dynamic performance to a desired level of spatial and dynamic performance;

(f) repeating steps (b) to (e) using different tuning parameters with constraints until the calculated spatial and dynamic performance meets or exceeds the desired level of spatial and dynamic performance;

(g) inputting optimal tuning parameters to the CDMD MPC; and (h) controlling the spatially-distributed sheet process with the CDMD MPC.

In yet another embodiment, the invention is directed to a system which forms a sheet of material in a multivariable-array spatially-distributed sheet process wherein the system includes:

(a) at least two sets of actuator arrays each distributed adjacent the material in the cross direction (CD), wherein each set of actuator arrays is controllable to vary the properties of the material;

(b) means for measuring and acquiring properties data about the properties of the material in the cross direction;

(c) a cross-direction machine-direction multivariable model predictive controller (CDMD MPC) for the spatially-distributed sheet process providing CD control to the multiple-array cross-directional process, wherein the MPC, in response to signals that are indicative of the properties data, provides signals to the at least two sets of actuator arrays to vary properties of the material;

(d) means for fast approximating the performance of the CDMD MPC, based on a process model for the spatially-distributed sheet process and tuning parameters and constraints, that includes (i) means for calculating the steady-state spatial performance of the CDMD MPC and (ii) means for calculating the dynamic performance of the CDMD MPC.

BRIEF DESCRIPTION OF THE DRAWINGS

FIGS. 7(A)-(D) are graphs of CD actuator profiles at steady-state generated by the closed-loop simulation and by the spatial performance prediction method;

FIGS. 8(A)-(C) show 2-sigma trend plots of measurement profiles generated by the closed-loop simulation and by the performance prediction method illustrating dynamic performance; and FIGS. 9(A)-(D) show 2-sigma trend plots of actuator profiles generated by the closed-loop simulation and by the performance prediction illustrating method dynamic performance.

DETAILED DESCRIPTION OF PREFERRED EMBODIMENTS

Figure 1:
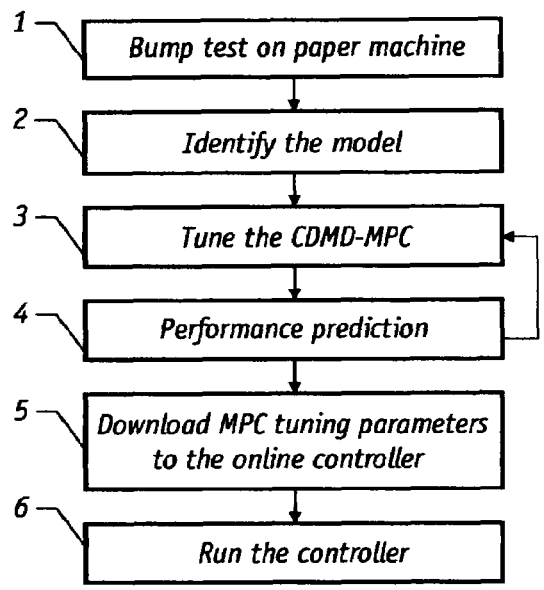
FIG. 1 is a procedure for implementation of an industrial paper machine CD control.

The present invention is generally directed to techniques for implementing a MPC control system. In particular, a fast performance prediction method for large-scale multivariable MPC with active constraints replaces the current closed-loop simulation which requires enormous computation and is very slow. Operation of MPC for coordinated cross direction and machine direction control initially involves the development of a plant model. In the case of a papermaking machine, this step is preferably accomplished by conducting bump tests followed by identifying the model as Steps 1 and 2 in FIG. 1. Next, the prediction horizon and optimization weights are selected by tuning the MPC (that is Step 3 in FIG. 1). Thereafter, the controller's performance is predicted using the optimal tuning parameters obtained in the previous step. As further detailed herein, the present invention provides a fast performance prediction technique (i.e., Step 4 in FIG. 1) that is particularly suited for a large-scale multivariable MPC.

Once the above sequence is completed, the tuning parameters can be downloaded onto the online controller which can be employed to automate the target system (plant) by combining a prediction and control strategy. The control strategy compares predicted plant signals to a set of objectives and then adjusts available actuators to achieve the objectives while respecting the plant's constraints.

The operations of an MPC including preferred tuning methods are further described in U.S. patent application Ser. No. 11/260,809 entitled "Automated Tuning of Large-Scale Multivariable Model Predictive Controllers for Spatially-Distributed Process," by Fan & Stewart and filed on Oct. 27, 2005, U.S. Pat. No. 6,807,510 to Backstrom and He, and J. Fan et al., "Approximate Steady-State Performance Prediction of Large-Scale Constrained Model Predictive Control Systems," IEEE Transactions on Control Systems Technology, vol. 13, no 6, November 2005, which are all incorporated herein by reference.

Figure 2:
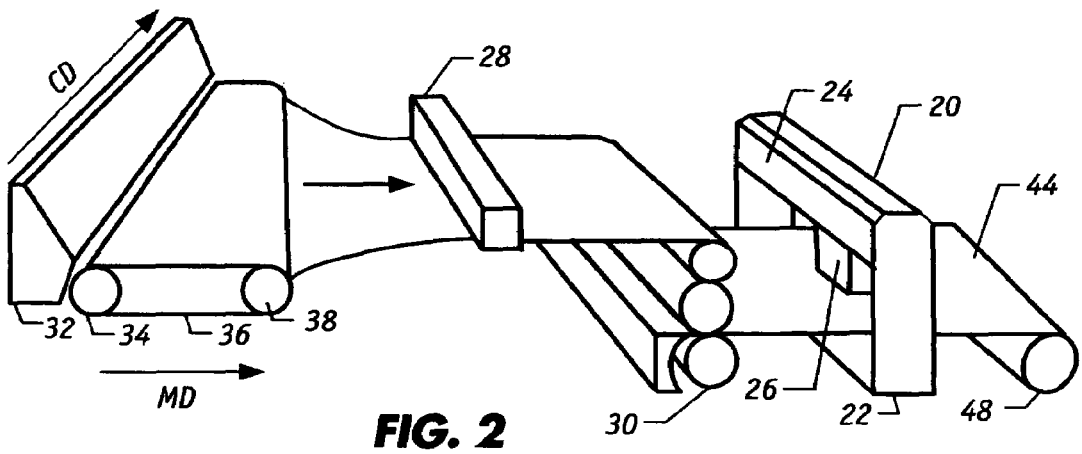
FIG. 2 illustrates a paper making system.

The inventive performance prediction method will be illustrated by implementing the technique in a large-scale multivariable MPC that controls a sheetmaking process such as a papermaking machine or the associated supercalendering process. A suitable papermaking machine as illustrated in FIG. 2 for producing a continuous sheet of paper material 44 includes a headbox 32, a steambox 28, a calendaring stack 30, a take-up reel 48 and scanner system 20. In the headbox 32, actuators are arranged to control discharge of wetstock onto supporting wire or web 36 along the cross direction (CD). The sheet of fibrous material that forms on top of the wire 36 is trained to travel in the machine direction (MD) between rollers 34 and 38 and passes through a calendaring stack 30. The calendaring stack 30 includes actuators that control the compressive pressure applied across the paper web. The sheet-making system includes a press section (not shown) where water is mechanically removed from the sheet and where the web is consolidated. Thereafter, water is removed by evaporation in the dryer section (not shown). The finished sheet product 44 is collected on a reel 48. In practice, the portion of the paper making process near a headbox is referred to as the "wet end", while the portion of the process near a take-up reel is referred to as the "dry end".

The on-line scanner system 20 generally includes pairs of horizontally extending guide tracks 24 that span the width of the paper product 44. The guide tracks are supported at their opposite ends by upstanding stanchions 22 and are spaced apart vertically by a distance sufficient to allow clearance for paper product 44 to travel between the tracks. The sensor is secured to a carriage 26 that moves back-and-forth over to paper product 44 as measurements are made.

It is understood that the inventive technique is sufficiently flexible as to be applicable to any large-scale industrial multivariable cross-directional (CD) process that is controlled by a multivariable MPC. For instance, besides the off-machine and on-machine supercalendering processes, other paper machine processes can also be controlled by a multivariable MPC. Suitable paper machine processes where paper is continuously manufactured from wet stock are further described, for instance, in U.S. Pat. No. 6,805,899 to MacHattie et al., U.S. Pat. No. 6,466,839 to Heaven et al., U.S. Pat. No. 6,149,770, to Hu et al., U.S. Pat. No. 6,092,003 to Hagart-Alexander et al, U.S. Pat. No. 6,080,278 to Heaven et al., U.S. Pat. No. 6,059,931 to Hu et al., U.S. Pat. No. 6,853,543 to Hu et al., and U.S. Pat. No. 5,892,679 to He, which are all assigned to Honeywell International, Inc. and are incorporated herein by reference. The inventive technique can also be applied to plastic sheetmaking, rubber sheetmaking, and sheet metal operations.

Each sheetmaking process, or group of associated processes, has certain input, e.g., flow, feed, power, etc., and output, e.g., temperature, pressure, etc., characteristics associated with it. In recent years, model predictive control techniques have been used to optimize certain processes as a function of such characteristics. One MPC technique uses algorithmic representations of certain processes to estimate characteristic values (represented as parameters, variables, etc.) associated with them that can be used to better control such processes. In recent years, physical, economic and other factors have been incorporated into control systems for these associated processes. Examples of such techniques are described in U.S. Pat. No. 5,351,184 to Lu et al., U.S. Pat. No. 5,561,599 to Lu, U.S. Pat. No. 5,572,420 to Lu, U.S. Pat. No. 5,574,638 to Lu and U.S. Pat. No. 6,807,510 to Backstrom and He, all of which are assigned to Honeywell International, Inc. and which incorporated herein by reference.

Figure 3:
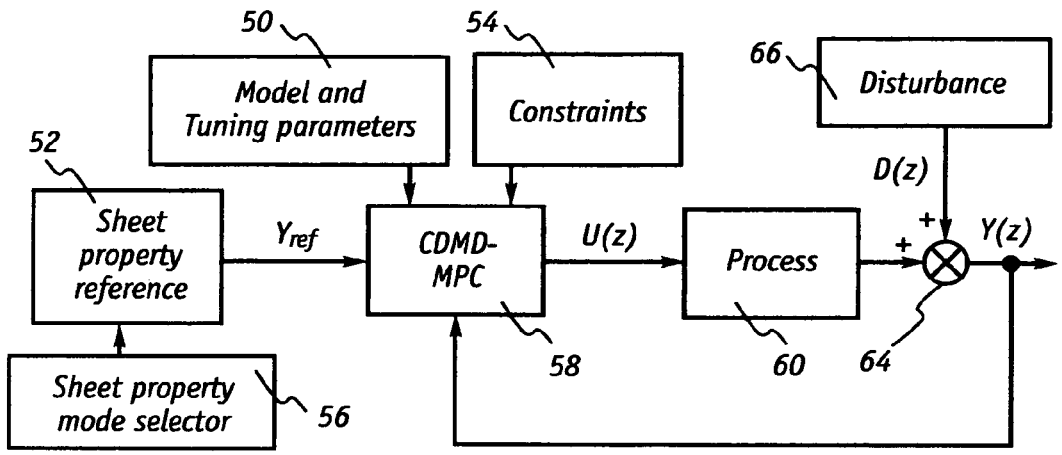
FIG. 3 is a block diagram of a closed-loop system with a CDMD-MPC for paper machine CD processes.

FIG. 3 shows a block diagram of a closed-loop paper machine control system with a CDMD MPC which is further described in U.S. Pat. No. 6,807,510 to Backstrom and He. The controller 58 is designed to minimize the difference between the sheet property reference 52 $Y_{ref}$ chosen from the sheet property mode selector 56 and the predicted future measurement profile calculated from the model and the current measurements from the scanner system 20 shown in FIG. 2 subject to the tuning parameters 50 and the constraints 54. The controller's output profiles U(z) are sent to the CD actuator arrays in paper machine process 60 and then the combined process output and disturbance 66 detected by the scanner system are fed back to the controller 58.

Sheet Property Mode Definition

The industrial implementation of an MPC strategy for CD process is known in the art and is described for example in U.S. Pat. No. 6,807,510. The implementation includes an objective or cost function that is solvable to yield an array of optimal changes in the current actuator setpoints for coordinated MD and CD control of the sheet making process. A suitable cost function of CDMD MPC is set up as:

$$\min_{\Delta U(k)} J(k) = \min_{\Delta U(k)} \sum_{j=T_d+1}^{H_p} E^T(k+j)Q_1 E(k+j) + \Delta U^T(k)Q_2 \Delta U(k) + \quad (1)$$
$$(U(k)-U_{ref})^T Q_3 (U(k)-U_{ref}) + U^T(k) Q_4 U(k)$$

subject to: $A\Delta U(k) < b - C \cdot U(k-1)$, (2)

$$\underbrace{\begin{bmatrix} y_1(z) \\ \vdots \\ y_p(z) \end{bmatrix}}_{Y(z)} = \underbrace{\begin{bmatrix} B_{11} \cdot h_{11}(z) & \cdots & B_{1q} \cdot h_{1q}(z) \\ \vdots & \ddots & \vdots \\ B_{p1} \cdot h_{p1} & \cdots & B_{pq} \cdot h_{pq}(z) \end{bmatrix}}_{G(z)} \cdot \underbrace{\begin{bmatrix} u_1(z) \\ \vdots \\ u_q(z) \end{bmatrix}}_{U(z)} + \underbrace{\begin{bmatrix} d_1(z) \\ \vdots \\ d_p(z) \end{bmatrix}}_{D(z)} \quad (3)$$

where $E(k)=Y_{ref}(k)-\hat{Y}(k)$, $Y_{ref}(k) \in R^{(p \cdot m) \times 1}$ are the target measurement profiles and $\hat{Y}(k) \in R^{(p \cdot m) \times 1}$ are predicted future measurement profiles, $H_p$ in (1) is the prediction horizon and $T_d$ is the minimum value of all subplant's time delay (i.e., $T_{dij}$ in (4)), $$U(k) \in R^{\left(\sum_{j=1}^q n_j\right) \times 1} \text{ and } U_{ref} \in R^{\left(\sum_{j=1}^q n_j\right) \times 1}$$

are the actuator profiles and desired actuator profiles respectively, $\Delta U(k) (=U(k)-U(k-1))$ are the change of the actuator profiles, $Q_1$ to $Q_4$ are tuning weights of CDMD MPC defined as $$Q_1 \in R^{(p \cdot m) \times (p \cdot m)} = diag(q_{11}I_m, q_{12}I_m, \cdots, q_{1p}I_m),$$

$$Q_2 \in R^{\sum_{j=1}^q n_j \times \sum_{j=1}^q n_j} = diag(q_{21}I_{n_1}, q_{22}I_{n_2}, \cdots, q_{2q}I_{n_q}),$$

$$Q_3 \in R^{\sum_{j=1}^q n_j \times \sum_{j=1}^q n_j} = diag(q_{31}I_{n_1}, q_{32}I_{n_2}, \cdots, q_{3q}I_{n_q}),$$

$$Q_4 \in R^{\sum_{j=1}^q n_j \times \sum_{j=1}^q n_j} = diag(q_{41}B_{n_1}^T B_{n_1}, q_{42}B_{n_2}^T B_{n_2}, \cdots, q_{4q}B_{n_q}^T B_{n_q}),$$

where "$diag(x_1, x_2, \ldots, x_n)$" means a (block) diagonal matrix with (block) diagonal element of $x_1, x_2, \ldots, x_n$; $I_n$ denotes an n-by-n identity matrix; $B_{n_j} \in R^{n_j \times n_j}$ is the bending moment matrix for the $j^{th}$ actuator array; A, C, and b in (2) are constraint matrices and vector respectively; $y_i(z) \in C^{m \times 1}$ and $d^i(z) \in C^{m \times 1}$ in (3) are the $i^{th}$ measurement and disturbance profiles respectively, and $u_j(z) \in C^{n_j \times 1}$ in (3) is the $j^{th}$ actuator profile, $B_{ij} \in R^{m \times n_j}$ is the $(i,j)^{th}$ subplant's spatial response matrix, and $h_{ij}(z)$ is the $(i,j)^{th}$ subplant's dynamic response defined as $$h_{ij}(z) = \frac{(1-a_{ij})z^{-T_{dij}}}{1-a_{ij}z^{-1}}, \quad (4)$$

where $T_{dij}$ is the $(i,j)^{th}$ subplant's time delay, and $a_{ij}$ is a scalar related to the $(i,j)^{th}$ subplant's time constant and the sampling time.

When predicting performance in the CD only mode, both $Y_{ref}(k)(=Y_{cdt}(k))$ and $\hat{Y}(k)$ are zero-mean vectors where $Y_{cdt}(k)$ is the CD shape target vector which is a zero vector in the majority of cases.

When predicting performance in the MD only mode, both $Y_{ref}(k)(=Y_{mdt}(k))$ and $\hat{Y}(k)$ (=mean $(Y(k))$ are vectors with the same element, where $Y_{mdt}(k)$ is the MD target vector.

When predicting performance in the CD & MD mode, both $Y_{ref}(k)(=Y_{mdt}(k)+Y_{cdt}(k))$ and $\hat{Y}(k)(=$mean $(Y(k))$ are neither zero-mean vectors nor vectors with the same element.

Performance Prediction Method

Figure 4:
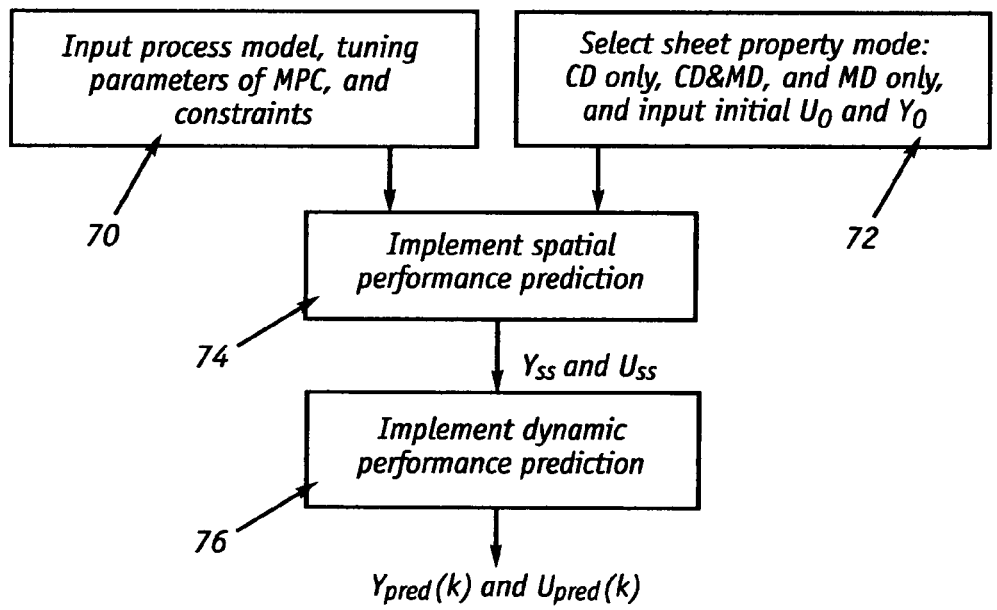
FIG. 4 is a diagram showing the process steps of the present invention.

As shown in FIG. 4 and described further herein, once the process model, tuning parameters and constraints 70 are determined, and the initial actuator profiles $U_0$ and measurement profiles $Y_0$ 72 are given, this information is employed with the inventive process to then steady-state spatial performances for the CD only, MD only and CD & MD sheet property modes are predicted. During the steady-state spatial performance prediction 74, the original CDMC MPC's cost function is approximated to be a steady-state cost function. Then the steady-state measurement and actuator profiles can be calculated through the steady-state cost function. After obtaining the steady-state actuator profiles, the actuator profiles in time series can be efficiently solved by minimizing the difference between the actuator profiles and the steady-state actuator profiles in the face of constraints. Finally, after obtaining the actuator profiles in time series, the model can be employed to expeditiously compute the measurement profiles in times series. Thereafter, the dynamic performance 76 is predicted on the basis of the steady-state actuator profiles. Typically, the entire performance prediction process requires less than one minute to complete.

Spatial Performance Prediction

1. Build the steady-state objective function:

$$J_s = (Y_{ref} - N \cdot Y_{ss})^T Q_{s1}(Y_{ref} - N \cdot Y_{ss}) + (U_{ss} - U_{ref})^T Q_{s3}(U_{ss} - U_{ref}) + U_{ss}^T Q_{s4} U_{ss}, \quad (5)$$

where $Y_{ss}$ and $U_{ss}$ are the steady-state measurement and actuator profiles respectively, $Q_{s1}$, $Q_{s3}$, and $Q_{s4}$ are the weights corresponding to $Q_1$, $Q_3$, $Q_4$ in (1) which will be solved in the next step, N is a sheet property mode related matrix defined as $$N = \begin{bmatrix} N_1 & & \\ & \ddots & \\ & & N_p \end{bmatrix} \in R^{(p \cdot m) \times (p \cdot m)}, \quad (6)$$

$$N_i \in R^{m \times m} = \begin{cases} \begin{bmatrix} 1 & & 0 \\ & \ddots & \\ 0 & & 1 \end{bmatrix} - \frac{1}{m}\begin{bmatrix} 1 & \cdots & 1 \\ \vdots & \ddots & \vdots \\ 1 & \cdots & 1 \end{bmatrix}, & \text{CD only} \\ \frac{1}{m}\begin{bmatrix} 1 & \cdots & 1 \\ \vdots & \ddots & \vdots \\ 1 & \cdots & 1 \end{bmatrix}, & \text{MD only} \\ \begin{bmatrix} 1 & & 0 \\ & \ddots & \\ 0 & & 1 \end{bmatrix}, & \text{CD \& MD} \end{cases} \quad (7)$$

where m is the common resolution of the sheet properties $y_i(z)$ in (3).

2. Solve $Q_{s1}$, $Q_{s3}$, and $Q_{s4}$ by minimizing the difference between two controllers without constraints, one from the CDMD MPC controller at steady-state in (1) and the other from the above one step steady-state "controller" in (5). The solution can be efficiently obtained as $$Q_{s1} = Q_1, \quad (8)$$

$$Q_{s3} = \begin{bmatrix} \frac{1}{\bar{r}_1}Q_{31} & & 0 \\ & \ddots & \\ 0 & & \frac{1}{\bar{r}_q}Q_{3q} \end{bmatrix}, Q_{s4} = \begin{bmatrix} \frac{1}{\bar{r}_1}Q_{41} & & 0 \\ & \ddots & \\ 0 & & \frac{1}{\bar{r}_q}Q_{4q} \end{bmatrix}, \quad (9)$$

where $$\bar{r}_j = \text{mean}(r_{1j}, r_{2j}, \ldots, r_{pj}), \quad (10)$$

$$r_{ij} = \sum_{k=1}^{H_p - T_{dij}} \sum_{l=1}^{k} a_{ij}^{l-1}, i = 1, \ldots, p, j = 1, \ldots, q, \quad (11)$$

where "mean$(r_{1j}, r_{2j}, \ldots, r_{pj})$" in (10) is to obtain the average value of $r_{1j}, r_{2j}, \ldots, r_{pj}$, $H_p$ is from (1), $T_{dij}$ and $a_{ij}$ are from (4), p and q are from (3).

3. Minimize the above steady-state objective function (5) for steady-state predictions for measurement and actuator profiles as follows:

$$\min_{U_{ss}, Y_{ss}} J_s \quad (12)$$

subject to:

$$C \cdot U_{ss} < b, \quad (13)$$

$$\underbrace{\begin{bmatrix} y_{1ss} \\ \vdots \\ y_{pss} \end{bmatrix}}_{Y_{ss}} = \underbrace{\begin{bmatrix} B_{11} & \cdots & B_{1q} \\ \vdots & \ddots & \vdots \\ B_{p1} & \cdots & B_{pq} \end{bmatrix}}_{G_{ss}} \cdot \underbrace{\begin{bmatrix} u_{1ss} \\ \vdots \\ u_{qss} \end{bmatrix}}_{U_{ss}} + \underbrace{\begin{bmatrix} d_{1ss} \\ \vdots \\ d_{pss} \end{bmatrix}}_{D_{ss}}, \quad (14)$$

$$Y_0 = G_{ss}U_0 + D_{ss}, \quad (15)$$

where C and b are from (2), $G_{ss}$ is the model $G(z)$ in (3) at steady-state, $U_0$ and $Y_0$ are the initial actuator and measurement profiles respectively.

Dynamic Performance Prediction

1. Compute the estimated actuator profiles $U_e$ at time k=1 by minimizing the following objective function:

$$\min_{U_e} J_e = \min_{U_e}(U_e - U_{ss})^T(U_e - U_{ss}), \quad (16)$$

subject to:

$$A\Delta U_e < b - C \cdot U_0, \quad (17)$$

where $\Delta U_e = U_e - U_0$, A, b, and C are from (2).

2. Compute the real actuator profiles $U(k)(=U_0+\Delta U(k))$ at time k=1 from the controller's cost function in (1) subject to constraints (2) and (3) and solve the ratio $\alpha$ from the following objective function:

$$\min_{\alpha} J_\alpha = \min_{\alpha}(\Delta U(1) - \alpha\Delta U_e)^T(\Delta U(1) - \alpha\Delta U_e), \quad (18)$$

where $$\alpha = \begin{bmatrix} \alpha_1 I_{n_1} & & \\ & \ddots & \\ & & \alpha_q I_{n_q} \end{bmatrix},$$

$I_{n_j}$ with j=1 to q denotes an $n_j$-by-$n_j$ identity matrix.

3. Compute the predicted actuator profiles $U_{pred}(k)$ ($=U_{pred}(k-1)+\Delta U_{pred}(k)$) in time series k=1 to $k_0$ by minimizing the following function:

$$\min_{\Delta U_{pred}(k)} (\Delta U_{pred}(k) - \alpha(U_{ss} - U_{pred}(k-1)))^T \quad (19)$$

$$(\Delta U_{pred}(k) - \alpha(U_{ss} - U_{pred}(k-1)))$$

subject to: $A\Delta U_{pred}(k) < b - C \cdot U_{pred}(k-1)$, where $$U_{pred}(k) = \begin{bmatrix} u_{1pred}(k) \\ \vdots \\ u_{qpred}(k) \end{bmatrix} \in R^{\sum_{j=1}^{q} n_j}.$$

Note when $k=k_0$ which is typically less than 10, $U_{pred}(k)$ is almost same as $U_{ss}$. Therefore, after $k>k_0$, $U_{pred}(k)=U_{ss}$. Typically the maximum of k is 100.

4. Compute the measurement profiles $Y_{pred}(k)$ based on the following process model:

$$\Delta Y_{pred}(k) = G(z)\Delta U_{pred}(k-1), \quad (20)$$

$$Y_{pred}(k) = Y_{pred}(k-1) + \Delta Y_{pred}(k), \quad (21)$$

where $Y_{pred}(k) = \begin{bmatrix} y_{1pred}(k) \\ \vdots \\ y_{ppred}(k) \end{bmatrix} \in R^{(p \cdot m) \times 1}.$ 5. Calculate the 2-sigma trends for both the measurements $Y_{pred}(k)$ and the actuator profiles $U_{pred}(k)$ as follows, $$Y_{2\sigma}(k) = 2 \times \begin{bmatrix} \text{var}(y_{1pred}(k)) \\ \vdots \\ \text{var}(y_{ppred}(k)) \end{bmatrix} \in R^{p \times 1}, \quad (22)$$

$$U_{2\sigma}(k) = 2 \times \begin{bmatrix} \text{var}(u_{1pred}(k)) \\ \vdots \\ \text{var}(u_{qpred}(k)) \end{bmatrix} \in R^{q \times 1}, \quad (23)$$

where "var(a)" denotes the operation for calculating variance of the vector a.

EXAMPLE

The CD process in a supercalender at paper mill was used to demonstrate the effectiveness of the invention to predict the multivariable CDMD MPC's spatial and dynamic performance relative to closed-loop simulations. A supercalendering process is either an on-machine continuous process or an off-machine batch process. It is used to improve the paper sheet's surface properties, such as smoothness and gloss (shininess), which are critical for high-quality printing paper. The paper could be uncoated, one-side coated, or two-side coated.

Figure 5:
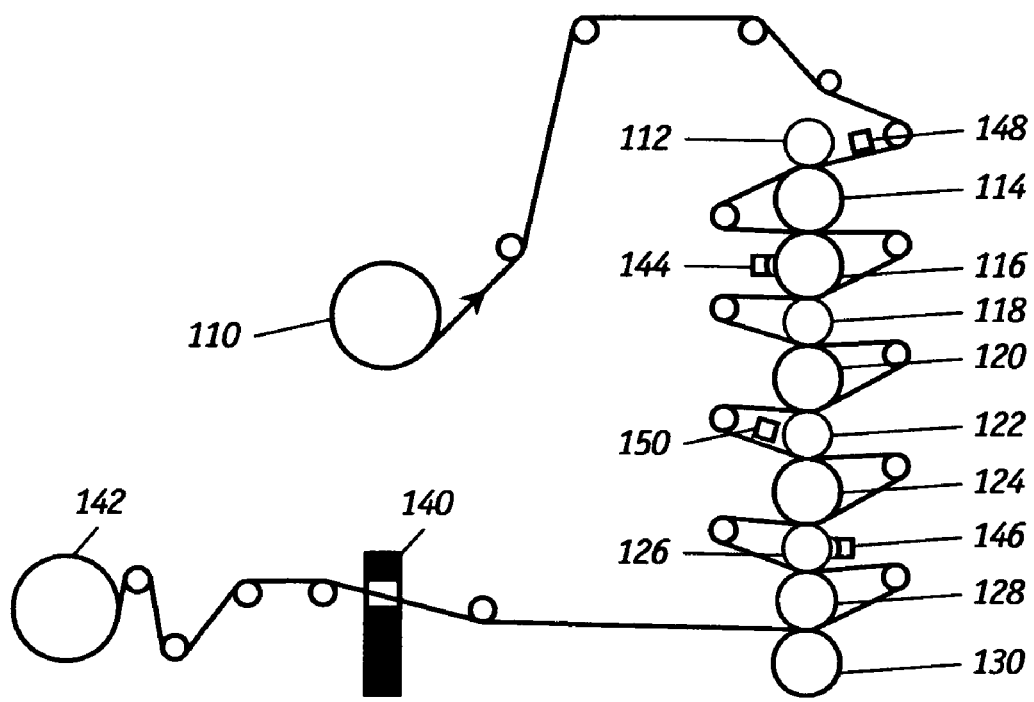
FIG. 5 illustrates an off-machine supercalender process used in a paper mill as an industrial example of this invention.

FIG. 5 depicts an off-machine supercalender. The supercalender CD process is used as a typical multiple CD array process model to illustrate the invention. That is, like other paper machine CD processes, the supercalendering process is a two-dimensional (spatial and temporal (or dynamical)) process which starts with unwinding the paper sheet from the reel at an unwinder 110. The paper sheet is then fed between a series of rolls 112, 114, 116, 118, 120, 122, 124, 126, 128, and 130 that are arranged vertically. The point between two rolls through which the paper sheet passes is called the nip. The rolls are arranged to alternate hard and soft with two consecutive soft rolls 118, 120 in the middle of the stack. The nip containing two consecutive soft rolls is called as the reversing nip. It is at this point where the work being done by the hard rolls is transferred from one side of the sheet to the other. The paper sheet passes out from the bottom of the stack, through the scanner 140 which measures sheet properties and is then wound up on the reel at the rewind stand 142. For CD measurements, on-line scanning sensors can be employed. Alternatively, an array of sensors can be positioned along the CD at any suitable position adjacent the moving sheet of paper.

Rolls 116 and 122 are heated with hot water. The process is also equipped with two steam box actuator arrays 148 and 150 and two induction heating actuator (referred to as "calcoil") arrays 144 and 146. For the two steam box actuator arrays, the top side one is designated $u_1$ and the wire side one $u_4$. For the two induction heating actuator arrays, the topside one is designated $u_2$ and wire side one $u_3$. Each steam box actuator array has $n_1=n_4=31$ actuators and each induction heating actuator array has $n_2=n_3=64$ actuators. The controlled sheet properties are top side gloss (smoothness) is designated $y_1$, caliper (thickness) $y_2$, and wire side gloss $y_3$. The number of measurement arrays is m=192 after signal processing of the scanner's sensors. This illustrative supercalender has 4 actuator arrays and 3 measurement arrays each with dimension 192. The multiple supercalender CD process is controlled by a CDMPC.

The supercalender was operated such that a process model and the initial measurement and actuator profiles were identified and collected. Thereafter, as presented in the data presented in FIGS. 6-9, the inventive performance prediction method was compared to a closed-loop simulation. The closed-loop simulation consists of running the controller in a hardware-in-loop environment. The data in FIGS. 6-9 were generated for the CD only mode.

Figure 6A:
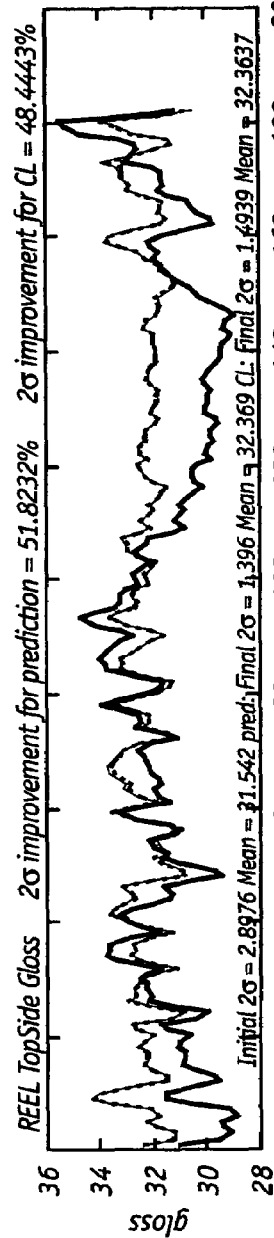
FIGS. 6(A)-(C) are graphs of CD measurement profiles at steady-state generated by the closed-loop simulation and by the spatial performance prediction method.
Figure 6B:
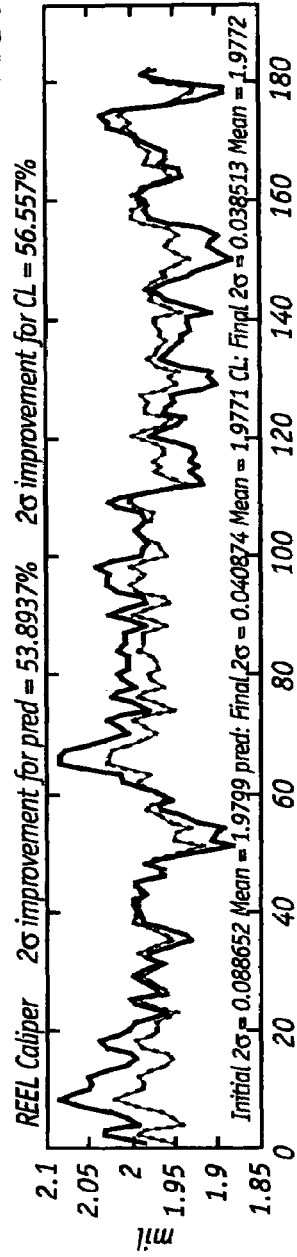
Figure 6C:
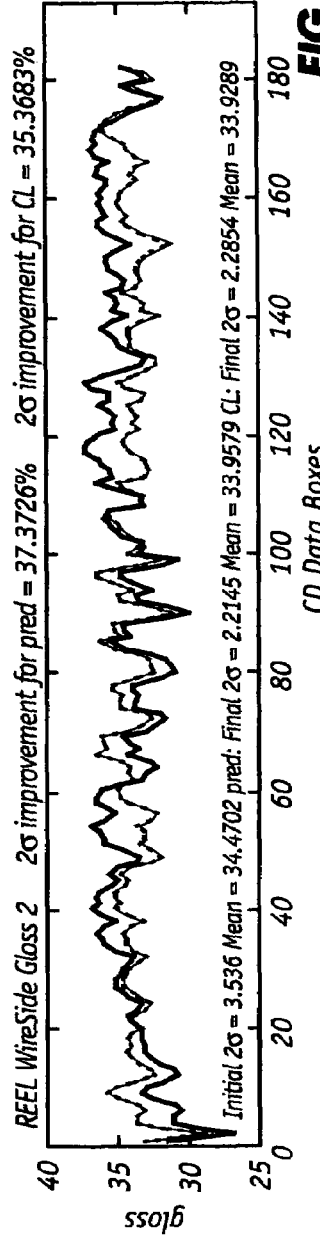

FIGS. 6A-6C are graphs of steady-state measurement profiles generated by the closed-loop (CL) simulation and by the spatial performance prediction method illustrating spatial performance. In each graph, the curve with thick solid line is the initial measurement profile before control, the curve with thin solid line is the predicted measurement profile after control, and the curve with dashed line is the steady-state measurement profile from the closed-loop simulation method after control. The two curves from the predicted method and the closed-loop simulation method were practically indistinguishable.

FIG. 6A depicts the gloss of the upper surface of the paper, FIG. 6B depicts the caliper or thickness of the paper, and FIG. 6C depicts the gloss of the wire or lower surface of the paper. The measurements were taken along the CD direction of the paper at the reel of the rewind stand of the supercalender. It is apparent that the inventive spatial performance prediction provided by the inventive prediction method yields comparable information to that of the traditional closed-loop technique.

FIGS. 7A-D are graphs of steady-state actuator profiles wherein the curve with solid line plus dots ("A" in FIG. 7A) denote the initial actuator profiles before control, vertical bars ("B" in FIG. 7A) are the predicted actuator profiles obtained by the inventive method and the curve with solid line plus squares ("C" in FIG. 7A) denote steady-state actuator profiles after control using the closed-loop simulation method.

FIGS. 7A, 7B, 7C, and 7D depict the CD actuator profiles on the top side steambox, top side induction coil, wire side induction coil, and wire side steam box, respectively. In each graph, the actuator profiles that were derived by the closed-loop simulation were practically the same as those of the predicted actuator profiles.

FIGS. 8A-8C and FIGS. 9A-9C are graphs of 2-sigma trend plots of measurement and actuator profiles generated by the closed-loop simulation method and by the performance prediction illustrating dynamic performance. In these two figures, the closed-loop (CL) curves and the predicted (Pred) curves were calculated in time series from the measurement and actuator profiles generated from the closed-loop simulation method and the predicted method, respectively.

It is evident that the dynamic performance by the inventive prediction technique is comparable to that of the closed-loop method. However, the total computation time for predicting the spatial performance shown in FIGS. 6 and 7 and the dynamic performance shown in FIGS. 7 and 8 are only 5.2 seconds and 14.5 seconds on a computer with 2.8 GHz CPU and 1 GB RAM compared to about 20 minutes for the closed-loop simulation method.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of fast approximating the performance of a cross-direction machine-direction multivariable model predictive controller (CDMD MPC) for a spatially-distributed sheet process that comprises the steps of:
    (a) identifying a process model for the spatially-distributed sheet process which is employed in a sheetmaking machine that forms a sheet of material and that comprises:
        (i) at least two sets of actuator arrays each distributed adjacent the material in the cross direction (CD), wherein each set of actuator arrays is controllable to vary properties of the material;
        (ii) means for measuring and acquiring properties data about the properties of the material in the cross direction;
        (iii) CDMD MPC for the spatially-distributed sheet process providing CD control to the multiple-array cross-directional process, wherein the MPC, in response to signals that are indicative of the properties data, provides signals to the at least two sets of actuator arrays to vary properties of the material; and
        (iv) means for fast approximating the performance of the CDMD MPC, based on the process model for the spatially-distributed sheet process and tuning parameters and constraints, that includes means for calculating a steady-state spatial performance of the CDMD MPC and means for calculating a dynamic performance of the CDMD MPC;
    (b) inputting tuning parameters and constraints into the CDMD MPC;
    (c) calculating steady-state spatial performance for the CDMD MPC for different sheet property modes that includes CD only mode, machine-direction (MD) only mode, and CD and MD mode;
    (d) calculating a dynamic performance for the CDMD MPC;
    (e) inputting optimal tuning parameters to the CDMD MPC; and
    (f) controlling the sheetmaking machine with the CDMD MPC.

2. The method of claim 1 wherein step (c) comprises inputting initial actuator profiles $U_0$ into the CDMD MPC and inputting initial measured profiles $Y_0$ into the CDMD MPC.

3. The method of claim 1 wherein step (c) yields steady-state actuator profiles $U_{ss}$ and steady-state measured profiles $Y_{ss}$ that are employed in step (d).

4. The method of claim 3 wherein step (d) yields predicted values for the actuator profiles $U_{pred}$ and predicted values for the measured profiles $Y_{pred}$.

5. The method of claim 1 wherein step (c) employs a steady-state objective function that is minimized to yield steady-state actuator profiles $U_{ss}$ and steady-state measured profile $Y_{ss}$.

6. The method of claim 1 wherein the CDMD MPC employs a cost function of the form:

$$\min_{\Delta U(k)} J(k) = \min_{\Delta U(k)} \sum_{j=T_d+1}^{H_p} E^T(k+j) Q_1 E(k+j) +$$

$$\Delta U^T(k) Q_2 \Delta U(k) + (U(k) - U_{ref})^T Q_3 (U(k) - U_{ref}) + U^T(k) Q_4 U(k)$$

subject to: $A\Delta U(k) \leq b - C \cdot U(k-1)$, $$\begin{bmatrix} y_1(z) \\ \vdots \\ y_p(z) \end{bmatrix}_{Y(z)} = \underbrace{\begin{bmatrix} B_{11} \cdot h_{11}(z) & \cdots & B_{1q} \cdot h_{1q}(z) \\ \vdots & \ddots & \vdots \\ B_{p1} \cdot h_{p1}(z) & \cdots & B_{pq} \cdot h_{pq}(z) \end{bmatrix}}_{G(z)} \cdot \underbrace{\begin{bmatrix} u_1(z) \\ \vdots \\ u_q(z) \end{bmatrix}}_{U(z)} + \underbrace{\begin{bmatrix} d_1(z) \\ \vdots \\ d_p(z) \end{bmatrix}}_{D(z)},$$

where $E(k) = Y_{ref}(k) - \hat{Y}(k)$, $Y_{ref}(k)$ are target measurement profiles and $\hat{Y}(k)$ are predicted future measurement profiles, $H_p$ in (1) is the prediction horizon, $Q_1$ to $Q_4$ are tuning weights of CDMD-MPC, $U(k)$ and $U_{ref}$ are actuator profiles and desired actuator profiles respectively, $y_i(z)$ and $d_i(z)$ are $i^{th}$ measurement and disturbance profiles respectively, and $u_j(z)$ is the $j^{th}$ actuator profile, $B_{ij}$ is the $(i,j)^{th}$ subplant's spatial response matrix, and $h_{ij}(z)$ is the $(i,j)^{th}$ subplant's dynamic response defined as $$h_{ij}(z) = \frac{(1-a_{ij})z^{-T_{dij}}}{1-a_{ij}z^{-1}},$$

such that when predicting performance in the CD only mode, both $Y_{ref}(k)(=Y_{cdt}(k))$ and $\hat{Y}(k)$ are zero-mean vectors, where $Y_{cdt}(k)$ is the CD shape target vector;

such that when predicting performance in the MD only mode, both $Y_{ref}(k)(=Y_{mdt}(k))$ and $\hat{Y}(k) = \text{mean}(Y(k))$ are vector with the same element, where $Y_{mdt}(k)$ is the MD target vector; and such that when predicting performance in the CD & MD mode, both $Y_{ref}(k)(=Y_{mdt}(k)+Y_{cdt}(k))$ and $\hat{Y}(k) = \text{mean}(Y(k))$ are neither zero-mean vectors nor vectors with the same element.

7. The method of claim 6 wherein step (c) comprises the steps of:

(i) providing a steady-state objective function that is in the form:

$$J_s = (Y_{ref} - N \cdot Y_{ss})^T Q_{s1} (Y_{ref} - N \cdot Y_{ss}) + (U_{ss} - U_{ref})^T Q_{s3} (U_{ss} - U_{ref}) + U_{ss}^T Q_{s4} U_{ss},$$

where $Y_{ss}$ and $U_{ss}$ are the steady-state measurement and actuator profiles respectively, $Q_{s1}$, $Q_{s3}$, and $Q_{s4}$ are the weights corresponding to $Q_1$, $Q_3$, and $Q_4$, respectively, N is a sheet property mode related matrix defined as $$N = \begin{bmatrix} N_1 & & \\ & \ddots & \\ & & N_p \end{bmatrix} \in R^{(p \cdot m) \times (p \cdot m)},$$

$$N_i \in R^{m \times m} = \begin{cases} \begin{bmatrix} 1 & & 0 \\ & \ddots & \\ 0 & & 1 \end{bmatrix} - \frac{1}{m} \begin{bmatrix} 1 & \cdots & 1 \\ \vdots & \ddots & \vdots \\ 1 & \cdots & 1 \end{bmatrix}, & \text{CD only} \\ \frac{1}{m} \begin{bmatrix} 1 & \cdots & 1 \\ \vdots & \ddots & \vdots \\ 1 & \cdots & 1 \end{bmatrix}, & \text{MD only} \\ \begin{bmatrix} 1 & & 0 \\ & \ddots & \\ 0 & & 1 \end{bmatrix}, & \text{CD \& MD} \end{cases}$$

where m is the common resolution of the sheet properties $y_i(z)$;

(ii) solving for $Q_{s1}$, $Q_{s3}$, and $Q_{s4}$ by minimizing the difference between two controllers without constraints, the first controller from the CDMD MPC controller at steady-state in (1) and the second controller from the above one step steady-state "controller" in (5); and (iii) minimizing the above steady-state objective function (5) for steady-state predictions for measurement and actuator profiles $Y_{ss}$ and $U_{ss}$ as follows:

$$\min_{U_{ss}, Y_{ss}} J_s$$

subject to: $C \cdot U_{ss} \leq b$, $$\begin{bmatrix} y_{1ss} \\ \vdots \\ y_{pss} \end{bmatrix}_{Y_{ss}} = \underbrace{\begin{bmatrix} B_{11} & \cdots & B_{1q} \\ \vdots & \ddots & \vdots \\ B_{p1} & \cdots & B_{pq} \end{bmatrix}}_{G_{ss}} \cdot \underbrace{\begin{bmatrix} u_{1ss} \\ \vdots \\ u_{qss} \end{bmatrix}}_{U_{ss}} + \underbrace{\begin{bmatrix} d_{1ss} \\ \vdots \\ d_{pss} \end{bmatrix}}_{D_{ss}},$$

$$Y_0 = G_{ss} U_0 + D_{ss},$$

where $U_0$ and $Y_0$ are the initial actuator and measurement profiles, respectively, $G_{ss}$ is the model $G(z)$ in (3) at steady-state.

8. The method of claim 7 wherein in step (ii) the solution can be efficiently obtained as $$Q_{s1} = Q_1,$$

$$Q_{s3} = \begin{bmatrix} \frac{1}{\bar{r}_1} Q_{31} & & 0 \\ & \ddots & \\ 0 & & \frac{1}{\bar{r}_q} Q_{3q} \end{bmatrix}, \quad Q_{s4} = \begin{bmatrix} \frac{1}{\bar{r}_1} Q_{41} & & 0 \\ & \ddots & \\ 0 & & \frac{1}{\bar{r}_q} Q_{4q} \end{bmatrix},$$

where $$\bar{r}_j = \text{mean}(r_{1j}, r_{2j}, \ldots, r_{pj}),$$

$$r_{ij} = \sum_{k=1}^{H_p - T_{dij}} \sum_{l=1}^{k} d_{ij}^{l-1}, \; i = 1, \ldots, p, \; j = 1, \ldots, q,$$

where "mean" is the operation of averaging a vector.

9. The method of claim 7 wherein step (d) comprises the steps of:

(i). computing the estimated actuator profiles $U_e$ at time $k=1$ by minimizing the following objective function:

$$\min_{U_e} J_e = \min_{U_e} (U_e - U_{ss})^T (U_e - U_{ss}),$$

subject to: $A\Delta U_e \leq b - C \cdot U_0$, where $\Delta U_e = U_e - U_0$;

(ii). computing the real actuator profiles $U(k)$ $(=U_0 + \Delta U(k))$ at time $k=1$ from the controller's objective function in (1) subject to constraints (2) and (3) and solve the ratio $\alpha$ from the following objective function:

$$\min_\alpha J_\alpha = \min_\alpha (\Delta U(1) - \alpha \Delta U_e)^T (\Delta U(1) - \alpha \Delta U_e),$$

$$\text{where } \alpha = \begin{bmatrix} \alpha_1 I_{n_1} & & \\ & \ddots & \\ & & \alpha_q I_{n_q} \end{bmatrix}; \text{ and}$$

(iii). compute the predicted actuator profiles $U_{pred}(k)$ $(=U_{pred}(k-1)+\Delta U_{pred}(k))$ in time series k=1 to $k_0$ by minimizing the following function:

$$\min_{\Delta U_{pred}(k)} J_u = \min_{\Delta U_{pred}(k)} (\Delta U_{pred}(k) - \alpha(U_{ss} - U_{pred}(k-1)))^T$$
$$(\Delta U_{pred}(k) - \alpha(U_{ss} - U_{pred}(k-1)))$$

subject to: $A\Delta U_{pred}(k) < b - C \cdot U_{pred}(k-1)$,
where $k_0 \leq 10$, after $k > k_0$, $U_{pred}(k) = U_{ss}$; and (iv). computing the measurement profiles $Y_{pred}(k)$ based on the following process model: $\Delta Y_{pred}(k) = G(z) \Delta U_{pred}(k-1)$, $$Y_{pred}(k) = Y_{pred}(k-1) + \Delta Y_{pred}(k-1).$$

10. The method of claim 9 wherein step (d) further comprises the step of calculating 2-sigma trends for both the measurements $Y_{pred}(k)$ and the actuator profiles $U_{pred}(k)$ as $$Y_{2\sigma}(k) = 2 \times \begin{bmatrix} \text{var}(y_{1pred}(k)) \\ \vdots \\ \text{var}(y_{ppred}(k)) \end{bmatrix} \in R^{p \times 1},$$

$$U_{2\sigma}(k) = 2 \times \begin{bmatrix} \text{var}(u_{1pred}(k)) \\ \vdots \\ \text{var}(u_{qpred}(k)) \end{bmatrix} \in R^{q \times 1},$$

where "var($\alpha$)" denotes the operation for calculating variance of the vector $\alpha$.

11. In a process control system having a cross-direction machine-direction multivariable model predictive controller (CDMD MPC) for providing control to a spatially-distributed sheet process which is employed in a sheetmaking machine that includes at least one manipulated actuator array and at least one controlled measurement array and that forms a sheet of material and, a method for providing control of the spatially-distributed sheet process that comprises the steps of:

(a) identifying a process model for the spatially-distributed sheet process;
(b) inputting tuning parameters and constraints into the CDMD MPC while operating the sheetmaking machine;
(c) calculating a steady-state spatial performance for the CDMD MPC for different sheet property modes that includes CD only mode, machine-direction (MD) only mode, and CD and MD mode while operating the sheetmaking machine;
(d) calculating a dynamic performance for the CDMD MPC while operating the sheetmaking machine;
(e) comparing the calculated spatial and dynamic performance to a desired level of spatial and dynamic performance;
(f) repeating steps (b) to (e) using different tuning parameters with constraints until the calculated spatial and dynamic performance meets or exceeds the desired level of spatial and dynamic performance;
(g) inputting optimal tuning parameters to the CDMD MPC; and
(h) controlling the spatially-distributed sheet process with the CDMD MPC while operating the sheetmaking machine.

12. The process of claim 11 wherein step (c) comprises inputting initial actuator profiles $U_0$ into the CDMD MPC and inputting initial measured profiles $Y_0$ into the CDMD MPC.

13. The process of claim 11 wherein step (c) yields steady-state actuator profiles $U_{ss}$ and steady-state measured profiles $Y_{ss}$ that are employed in step (d).

14. The process of claim 13 wherein step (d) yields predicted values for the actuator profiles $U_{pred}$ and predicted values for the measured profiles $U_{pred}$.

15. The process of claim 11 wherein step (c) employs a steady-state objective function that is minimized to yield steady-state actuator profile $U_{ss}$ and steady-state measured profiles $Y_{ss}$.

16. The process of claim 11 wherein the CDMD MPC employs a cost function of the form:

$$\min_{\Delta U(k)} J(k) = \min_{\Delta U(k)} \sum_{j=T_d+1}^{H_p} E^T(k+j) Q_1 E(k+j) +$$
$$\Delta U^T(k) Q_2 \Delta U(k) + (U(k) - U_{ref})^T Q_3 (U(k) - U_{ref}) + U^T(k) Q_4 U(k)$$

subject to: $A\Delta U(k) < b - C \cdot U(k-1)$, $$\underbrace{\begin{bmatrix} y_1(z) \\ \vdots \\ y_p(z) \end{bmatrix}}_{Y(z)} = \underbrace{\begin{bmatrix} B_{11} \cdot h_{11}(z) & \cdots & B_{1q} \cdot h_{1q}(z) \\ \vdots & \ddots & \vdots \\ B_{p1} \cdot h_{p1}(z) & \cdots & B_{pq} \cdot h_{pq}(z) \end{bmatrix}}_{G(z)} \cdot \underbrace{\begin{bmatrix} u_1(z) \\ \vdots \\ u_q(z) \end{bmatrix}}_{U(z)} + \underbrace{\begin{bmatrix} d_1(z) \\ \vdots \\ d_p(z) \end{bmatrix}}_{D(z)},$$

where $E(k) = Y_{ref}(k) - \hat{Y}(k)$, $Y_{ref}(k)$ are target measurement profiles and $\hat{Y}(k)$ are predicted future measurement profiles, Hp in (1) is the prediction horizon, $Q_1$ to $Q_4$ are tuning weights of CDMD-MPC, U(k) and $U_{ref}$ are actuator profiles and desired actuator profiles, $y_i(z)$ and $d_i(z)$ are $i^{th}$ measurement and disturbance profiles respectively, and $u_j(z)$ is the $j^{th}$ actuator profile, $B_{ij}$ is the $(i,j)^{th}$ subplant's spatial response matrix, and $h_{ij}(z)$ is the $(i,j)^{th}$ subplant's dynamic response defined as $$h_{ij}(z) = \frac{(1 - a_{ij}) z^{-T_{dij}}}{1 - a_{ij} z^{-1}},$$

such that when predicting performance in the CD only mode, both $Y_{ref}(k)(=Y_{cdt}(k))$ and $\hat{Y}(k)$ are zero-mean vectors, where $Y_{cdt}(k)$ is the CD shape target vector;
such that when predicting performance in the MD only mode, both $Y_{ref}(k)(=Y_{mdt}(k))$ and $\hat{Y}(k)=$mean(Y(k)) are vector with the same element, where $Y_{mdt}(k)$ is the MD target vector; and
such that when predicting performance in the CD & MD mode, both $Y_{ref}(k)(=Y_{mdt}(k)+Y_{cdt}(k))$ and $\hat{Y}(k)=$mean (Y(k)) are neither zero-mean vectors nor vectors with the same element.

17. The process of claim 16 wherein step (c) comprises the steps of:

(i) providing a steady-state objective function that is in the form:

$$J_s = (Y_{ref} - N \cdot Y_{ss})^T Q_{s1}(Y_{ref} - N \cdot Y_{ss}(U_{ss} - U_{ref})^T Q_{s3}(U_{ss} - U_{ref}) + U_{ss}^T Q_{s4} U_{ss},$$

where $Y_{ss}$ and $U_{ss}$ are the steady-state measurement and actuator profiles respectively, $Q_{s1}$, $Q_{s3}$, and $Q_{s4}$ are the weights corresponding to $Q_1$, $Q_3$, and $Q_4$, respectively, in (1), N is a sheet property mode related matrix defined as $$N = \begin{bmatrix} N_1 & & \\ & \ddots & \\ & & N_p \end{bmatrix} \in R^{(p \cdot m) \times (p \cdot m)},$$

$$N_i \in R^{m \times m} = \begin{cases} \begin{bmatrix} 1 & & 0 \\ & \ddots & \\ 0 & & 1 \end{bmatrix} - \frac{1}{m}\begin{bmatrix} 1 & \cdots & 1 \\ \vdots & \ddots & \vdots \\ 1 & \cdots & 1 \end{bmatrix}, & \text{CD only} \\ \frac{1}{m}\begin{bmatrix} 1 & \cdots & 1 \\ \vdots & \ddots & \vdots \\ 1 & \cdots & 1 \end{bmatrix}, & \text{MD only} \\ \begin{bmatrix} 1 & & 0 \\ & \ddots & \\ 0 & & 1 \end{bmatrix}, & \text{CD \& MD} \end{cases}$$

where m is the common resolution of the sheet properties $y_i(z)$ in (3);

(ii) solving for $Q_{s1}$, $Q_{s3}$, and $Q_{s4}$ by minimizing the difference between two controllers without constraints, the first controller from the CDMD MPC controller at steady-state in (1) and the second controller from the above one step steady-state "controller" in (5); and (iii) minimizing the above steady-state objective function (5) for steady-state predictions for measurement and actuator profiles as follows:

$$\min_{U_{ss}, Y_{ss}} J_s$$

subject to: $C \cdot U_{ss} < b$, $$\begin{bmatrix} y_{1ss} \\ \vdots \\ y_{pss} \end{bmatrix} = \begin{bmatrix} B_{11} & \cdots & B_{1q} \\ \vdots & \ddots & \vdots \\ B_{p1} & \cdots & B_{pq} \end{bmatrix} \cdot \begin{bmatrix} u_{1ss} \\ \vdots \\ u_{qss} \end{bmatrix} + \begin{bmatrix} d_{1ss} \\ \vdots \\ d_{pss} \end{bmatrix},$$

$$\underbrace{\phantom{xxx}}_{Y_{ss}} \quad \underbrace{\phantom{xxxxxx}}_{G_{ss}} \quad \underbrace{\phantom{xxx}}_{U_{ss}} \quad \underbrace{\phantom{xxx}}_{D_{ss}}$$

$$Y_0 = G_{ss} U_0 + D_{ss},$$

where $U_0$ and $Y_0$ are the initial actuator and measurement profiles, respectively.

18. The process of claim 17 wherein in step (ii) the solution can be efficiently obtained as $$Q_{s1} = Q_1,$$

$$Q_{s3} = \begin{bmatrix} \frac{1}{\bar{r}_1} Q_{31} & & 0 \\ & \ddots & \\ 0 & & \frac{1}{\bar{r}_q} Q_{3q} \end{bmatrix}, Q_{s4} = \begin{bmatrix} \frac{1}{\bar{r}_1} Q_{41} & & 0 \\ & \ddots & \\ 0 & & \frac{1}{\bar{r}_q} Q_{4q} \end{bmatrix},$$

where $$\bar{r}_j = mean(r_{1j}, r_{2j}, \cdots, r_{pj}),$$

$$r_{ij} = \sum_{k=1}^{H_p - T_{dij}} \sum_{l=1}^{k} a_{ij}^{l-1}, i = 1, \cdots, p, j = 1, \cdots, q,$$

where

"mean" is the operation of averaging a vector.

19. The process of claim 17 wherein step (d) comprises the steps of:

(i). computing the estimated actuator profiles $U_e$ at time k=1 by minimizing the following objective function:

$$\min_{U_e} J_e = \min_{U_e}(U_e - U_{ss})^T(U_e - U_{ss}),$$

subject to: $A \Delta U_e < b - C \cdot U_0$, where $\Delta U_e = U_e - U_0$;

(ii). computing the real actuator profiles $U(k)$ ($= U_0 + \Delta U(k)$) at time k=1 from the controller's cost function in (1) subject to constraints (2) and (3) and solve the ratio a from the following objective function:

$$\min_{\alpha} J_\alpha = \min_{\alpha}(\Delta U(1) - \alpha \Delta U_e)^T(\Delta U(1) - \alpha \Delta U_e),$$

where $\alpha = \begin{bmatrix} \alpha_1 I_{n_1} & & \\ & \ddots & \\ & & \alpha_q I_{n_q} \end{bmatrix}$; and (iii). compute the predicted actuator profiles $U_{pred}(k)$ ($= U_{pred}(k-1) + \Delta U_{pred}(k)$) in time series k=1 to $k_0$ by minimizing the following function:

$$\min_{\Delta U_{pred}(k)} J_u = \min_{\Delta U_{pred}(k)} (\Delta U_{pred}(k) - \alpha(U_{ss} - U_{pred}(k-1)))^T$$

$$(\Delta U_{pred}(k) - \alpha(U_{ss} - U_{pred}(k-1)))$$

subject to: $A \Delta U_{pred}(k) < b - C \cdot U_{pred}(k-1)$, where $k_0 \leq 10$, and after $k > k_0$, $U_{pred}(k) = U_{ss}$; and (iv). computing the measurement profiles $Y_{pred}(k)$ based on the following process model: $\Delta Y_{pred}(k) = G(z) \Delta U_{pred}(k-1)$, $$Y_{pred}(k) = Y_{pred}(k-1) + \Delta Y_{pred}(k).$$

20. The process of claim 19 wherein step (d) further comprises the step of calculating 2-sigma trends for both the measurements $Y_{pred}(k)$ and the actuator profiles $U_{pred}(k)$ as $$Y_{2\sigma}(k) = 2 \times \begin{bmatrix} \text{var}(y_{1pred}(k)) \\ \vdots \\ \text{var}(y_{ppred}(k)) \end{bmatrix} \in R^{p \times 1},$$

$$U_{2\sigma}(k) = 2 \times \begin{bmatrix} \text{var}(u_{1pred}(k)) \\ \vdots \\ \text{var}(u_{qpred}(k)) \end{bmatrix} \in R^{q \times 1},$$

where "$\text{var}(\alpha)$" denotes the operation for calculating variance of the vector $\alpha$.

21. The process of claim 11 wherein the spatially-distributed process is a paper machine or an off-machine supercalender.

22. A system which forms a sheet of material in a multi-variable-array spatially-distributed sheet process wherein the system comprises:

(a) at least two sets of actuator arrays each distributed adjacent the material in the cross direction (CD), wherein each set of actuator arrays is controllable to vary the properties of the material;

(b) means for measuring and acquiring properties data about the properties of the material in the cross direction;

(c) a cross-direction machine-direction multivariable model predictive controller (CDMD MPC) for the spatially-distributed sheet process providing CD control to the multiple-array cross-directional process, wherein the MPC, in response to signals that are indicative of the properties data, provides signals to the at least two sets of actuator arrays to vary properties of the material; and (d) means for fast approximating the performance of the CDMD MPC, based on a process model for the spatially-distributed sheet process and tuning parameters and constraints, that includes (i) means for calculating the steady-state spatial performance of the CDMD MPC for different sheet property modes that includes CD only mode, machine-direction (MD) only mode, and CD and MD mode and (ii) means for calculating the dynamic performance of the CDMD MPC.

23. The system of claim 22 wherein the material is paper and each of the at least two sets of actuator arrays comprises a source of energy along the CD in a supercalender.

24. The system of claim 22 wherein the material is paper that is formed from wet stock in a papermaking machine.

25. The system of claim 22 wherein the means for measuring and acquiring properties data comprises a scanner that traverses adjacent the material in the cross direction.

* * * * *